United States Patent
Kanoh et al.

[11] Patent Number: 5,934,439
[45] Date of Patent: Aug. 10, 1999

[54] AUTOMATIC COMMERCIAL ARTICLE RENTING SYSTEM

[75] Inventors: Chiyuki Kanoh; Masanori Itoh, both of Matsumoto, Japan

[73] Assignee: Nippon T.M.I. Co., Ltd, Matsumoto, Japan

[21] Appl. No.: 08/921,904

[22] Filed: Sep. 2, 1997

[30] Foreign Application Priority Data

Nov. 21, 1996 [JP] Japan ................................. 8-310273

[51] Int. Cl.⁶ .............................. G07F 7/08; G07D 7/00; G06K 15/00
[52] U.S. Cl. ......................... 194/205; 194/906; 235/383
[58] Field of Search .............................. 194/906; 235/383

[56] References Cited

U.S. PATENT DOCUMENTS

| | | | |
|---|---|---|---|
| 4,300,040 | 11/1981 | Gould et al. ............................. | 235/381 |
| 4,458,802 | 7/1984 | Maciver et al. ......................... | 194/4 R |
| 4,598,810 | 7/1986 | Shore et al. ............................. | 194/205 |

FOREIGN PATENT DOCUMENTS

| | | | |
|---|---|---|---|
| 58-6549 | 1/1983 | Japan .............................. | G11B 15/68 |
| 62-82498 | 4/1987 | Japan .............................. | G07F 17/00 |

*Primary Examiner*—F. J. Bartuska
*Assistant Examiner*—Bryan J. Jaketic
*Attorney, Agent, or Firm*—Darby & Darby

[57] ABSTRACT

An automatic renting apparatus performs on-line trade utilizing a credit card, which includes a processing mechanism for processing a rented article not returned after expiration of a returning period. The automatic article renting apparatus effects sale process for the rented article not returned even after expiration of the renting period and the sale charge is automatically deducted from an account of the credit card. Thus, non-returned article can be automatically processed without requiring manual operation.

17 Claims, 8 Drawing Sheets

AUTOMATIC COMMERCIAL ARTICLE RENTING SYSTEM

BACKGROUND OF THE INVENTION (1) Field of the Invention

The present invention relates generally to an automatic renting system for automatically renting commercial articles, such as video cassettes, CDs and the like. More specifically, the invention relates to an automatic commercial article renting system which can automatically rent the commercial article and settle a rental fee using a credit card.

(2) Description of the Related Art

In order to reduce labor cost and enable operation around-the-clocks, shops which rent video cassettes, CDs and the like, have begun to use automatic renting systems for recorded media, such as video cassettes, CDs and the like.

An automatic renting system for video cassettes generally has a rectangular parallelepiped casing in which multi-staged cabinets for storing video cassettes are arranged. The video cassettes are stored in the cabinets so that stacks of respective video cassettes are visible through a transparent window of the glassed front face. On the side portion of the window, an operation plane or panel is provided as well as an opening for renting and returning video cassettes.

In operation, a user looks though the transparent glass window to identify a video cassette which he or she wishes to rent and then selects that cassette by operating buttons arranged on an operation plane. A mechanism is also provided to accept payment of the rental fee. A transporting mechanism provided in the automatic renting system takes out the video cassette stored in the designated cabinet and transports it to the renting and returning opening. The user may then retrieve the rented video cassette through the opening.

An automatic renting system for automatically renting the commercial articles can be "on-line" and configured to exchange information with a center in an on-line trade. For example, Japanese Unexamined Patent Publication (Kokai) Nos. SHO 58-6549 and SHO 62-82498 disclose terminal units for on-line trading of this type.

The on-line trading terminal unit disclosed in the above-identified publications include a reading means for reading a member card, such as a credit card or the like, and a communication means for transmitting information read from the card to a control center. The control center checks membership and credibility of the member based on the received member information and transmits a command to the on-line trading terminal unit authorizing or prohibiting the desired transaction. The on-line trading terminal unit performs automatic renting of the commercial article when trading is permitted. Once the commercial article is rented, the trade and renting fee are provided to the control center. The control center then exchanges trade information with the appropriate credit card company to settle the rental fee from the account of the member who rented the commercial article.

Such an on-line trading terminal unit is convenient for the user since it does not require handling of cash. It is also convenient at the site of the on-line trading terminal unit because it is unnecessary to include a cash handling machine or the like, thus reducing security concerns.

However in a conventional automatic renting system which rents articles using an on-line credit-card based system, a mechanism has not been provided for appropriately processing situations where the rented commercial article is not returned, even after expiration of a renting period. Although such management may be performed manually, this is not only inefficient but it also negates the advantage provided by using an automated on-line process.

Therefore, it is an object of the present invention to provide an automatic commercial article renting system which can appropriately handle the case when a rented article is not returned even after a set returning period.

SUMMARY OF THE INVENTION

According to a first aspect of the invention, an automatic article renting apparatus comprises an article storage portion, an article renting opening, and article transporting means for transporting the article between the article storage portion and the article renting opening. A card reader and input means are provided for reading credit card information and for entering the identification of the article to be rented. A communication means is used for communicating with a remote host computer. A control means is provided for performing the automatic renting process on the basis of input from the card reader, the input means, and a command from the remote host computer. A storage means is used to store information about a rented article and the rental, the scheduled return date, and other renting information, including member information.

A judgement means detects when a rented article is not returned by the scheduled return date. A sale processing means responsive to the detection by the judgement means that the rented article not returned by the return date processes a sale of non-return rented article to the user who rented the non-return rented article and transmits sale charge information to the remote host computer via the communication means. Thus, when a rented article is not returned by the end of the renting period, it is regarded as being sold to the member who rented the article and the sale charge is automatically deducted from the account of the credit card. Advantageously, management does not need to press users return rented articles on time.

To enable the automatic sales process, the member must agree in advance to the rental conditions. Preferably, members are given a membership code which must be provided at every trade to indicate agreement.

Because a rented article which is not returned by the end of the renting period may be regarded as sold to the member who did not return it, it is preferable that the storage means includes a storage area for storing information concerning the non-returned, and subsequently sold, article and a returning rejecting means be provided for rejecting an attempted return of the article after the sale to the member has been processed. Preferably, the fact that a sale has been processed by the sale processing means and information about the sold article is transmitted to the remote host computer via the communication means.

The automatic article renting apparatus may further comprise an article return opening for receiving a returned article, an auxiliary article storage portion for temporarily storing the returned article, a command means for requiring the member to take out a returned article from the article return opening when a record of the inserted article is not found in the renting information stored in the storage means, and a storage control means for storing the article in the auxiliary article storage portion when the returned article is not taken out from the article return opening despite of command by the commanding means.

In addition, the storage means may store information about abnormal trades, including information indicating the occurrence of abnormal trade, the identity of the subject article, and concerning the member returning the article. The communication means transmits the abnormal trade information to the remote host computer. The sale processing means suspends the sale process when an abnormal trade is recorded with respect to the objective member to effect sale process on the basis of the abnormal trade information stored in the storage means, and suspension of the sale process is transmitted to the remote host computer via the communication means. In addition, the apparatus include an article returning control means which returns a temporarily stored article when the member information read from the card reader matches the member information associated with the abnormal trade.

According to a second aspect of the invention, an automatic article renting system comprises a plurality of automatic article renting terminal apparatus connected to a central control center. The control center stores information including renting condition information with respect to each automatic article renting terminal apparatus and member information of each member.

Each of the automatic article renting terminal comprises an article storage portion, an article renting opening, and article transporting means for transporting the article between the article storage portion and the article renting opening. A card reader is provided for reading credit card information and an input means is provided to allow a user to identify the article to be rented.

A communication means is used for communicating with a central control center and a control means is provided for performing automatic renting process as described above. Rented article information, rented data, scheduled return date and renting information, including a member information, is stored in a storage means. A judgement means is used to detect when a rented article is not returned by the scheduled return date and a sale processing means responsive to the judgement means process the sale of a non-return rented article to the user who did not return it and transmits sale charge information to the central control center via the communication means.

BRIEF DESCRIPTION OF THE DRAWINGS

The present invention will be understood more fully from the detailed description given here below and from the accompanying drawings of the preferred embodiment of the invention, which, should not be taken limit the present invention, but are for explanation and understanding only, and in which.

DESCRIPTION OF THE PREFERRED EMBODIMENT

In the following description, numerous specific details are set forth in order to provide a thorough understanding of the present invention. It will be obvious, however, to those skilled in the art that the present invention may be practiced without these specific details. In some instances, well-known structures are not shown in detail to avoid unnecessary obscuring details of the present invention. The preferred embodiment of an automatic renting system and apparatus for video cassettes will be discussed with reference to the accompanying drawings.

Figure 1:
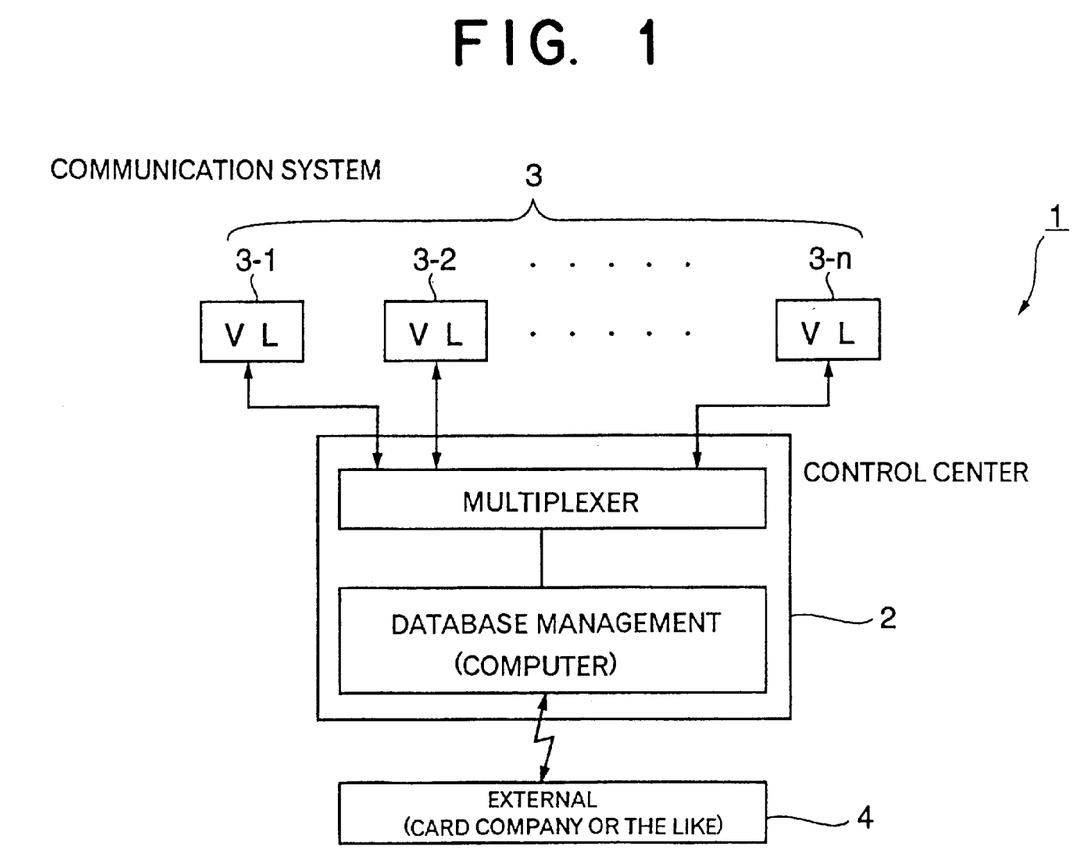
FIG. 1 is a general block diagram showing the overall construction of the preferred embodiment of an automatic renting system for video cassette of the present invention.

In FIG. 1, the overall construction of the preferred embodiment of an automatic renting system according to the present invention is illustrated. As shown in FIG. 1, an automatic renting system 1 is generally constructed with a control center (central office unit) 2, a plurality of automatic renting apparatus 3 (3-1, 3-2, 3-3, . . . ) connected as on-line terminal units to the control center 1, and an associated credit card company 4 connected on-line to the control center 2. In this embodiment, a credit card issued by the credit card company is used as a member card for rending the video cassette using the automatic renting apparatus 3. A general description of the renting operation of the video cassette follows.

When a member inserts their credit card in the automatic renting apparatus 3, member information stored on the card is read out. This information, which identifies the particular member, is transmitted to the control center 2. Then, the credibility of the identified member is checked. If a judgment is made that renting of the video cassette is permitted, the control center 2 feeds a command indicative this decision to the automatic renting apparatus 3. The automatic renting apparatus 3 is responsive to the command to perform a renting operation of the video cassette designated by the member. Once the renting operation is completed, trade information including the identity of the rented video cassette, the rental fee, and so forth, is transmitted to the control center 2. Finally, the control center 2 issues a request to the credit company to deduct the rental fee from the account indicated on the credit card.

When a video is returned, the member identifies themselves by inserting their credit card into the automatic renting apparatus 3.

The automatic renting apparatus 3 also monitors a returning period for each rented video cassette. If a video cassette has not been returned within the returning period, the automatic renting apparatus 3 processes a sale of the unreturned video cassette to the member who rented it. Information concerning the trade and sale charge thereof is transmitted to the control center 2, which, in turn, issues a request to the credit card company to deduct the sale charge from the delinquent member's credit card account.

Figure 2:
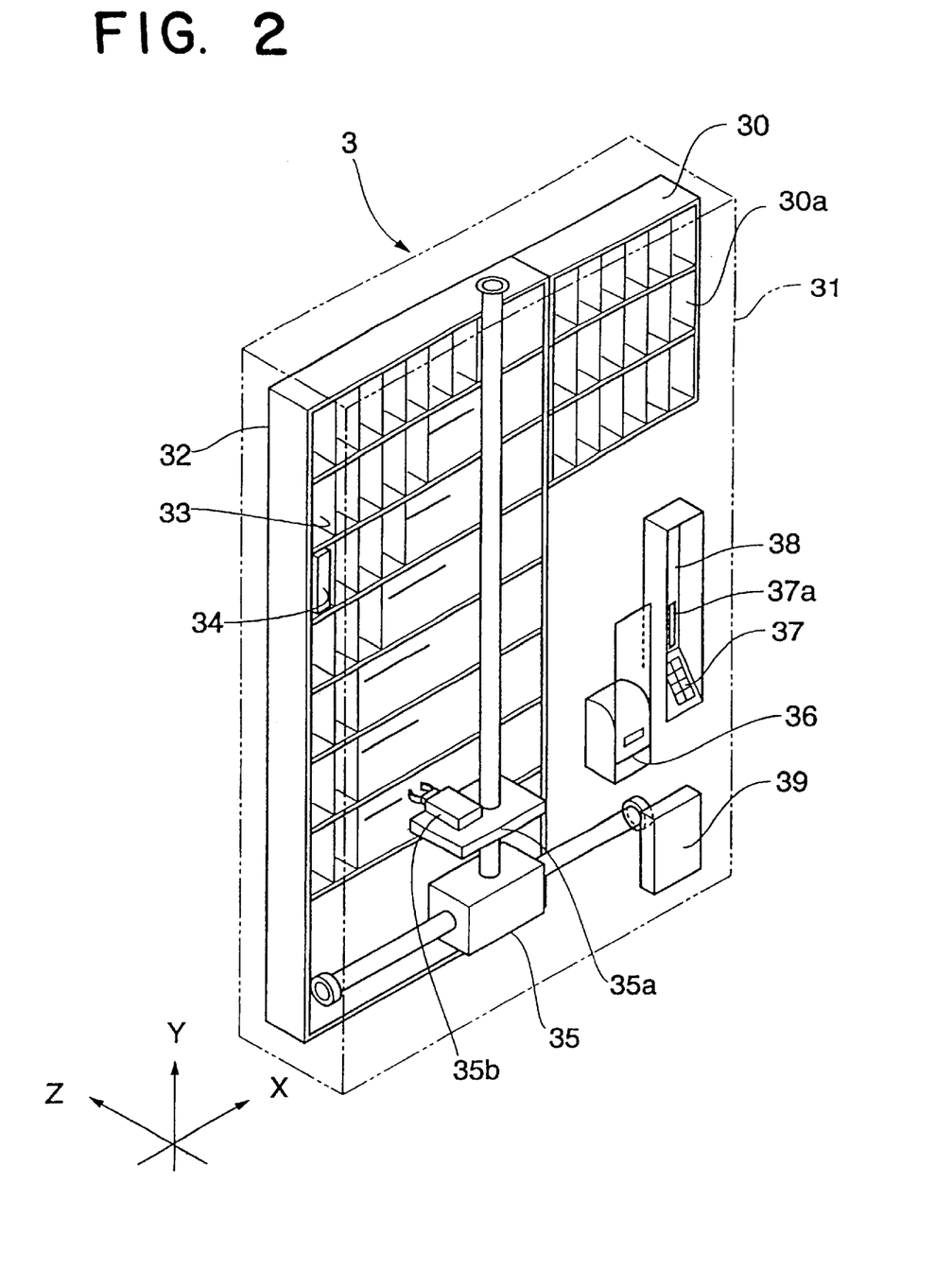
FIG. 2 is a perspective view showing general construction of the preferred embodiment of an automatic renting apparatus according to the present invention.
Figure 3:
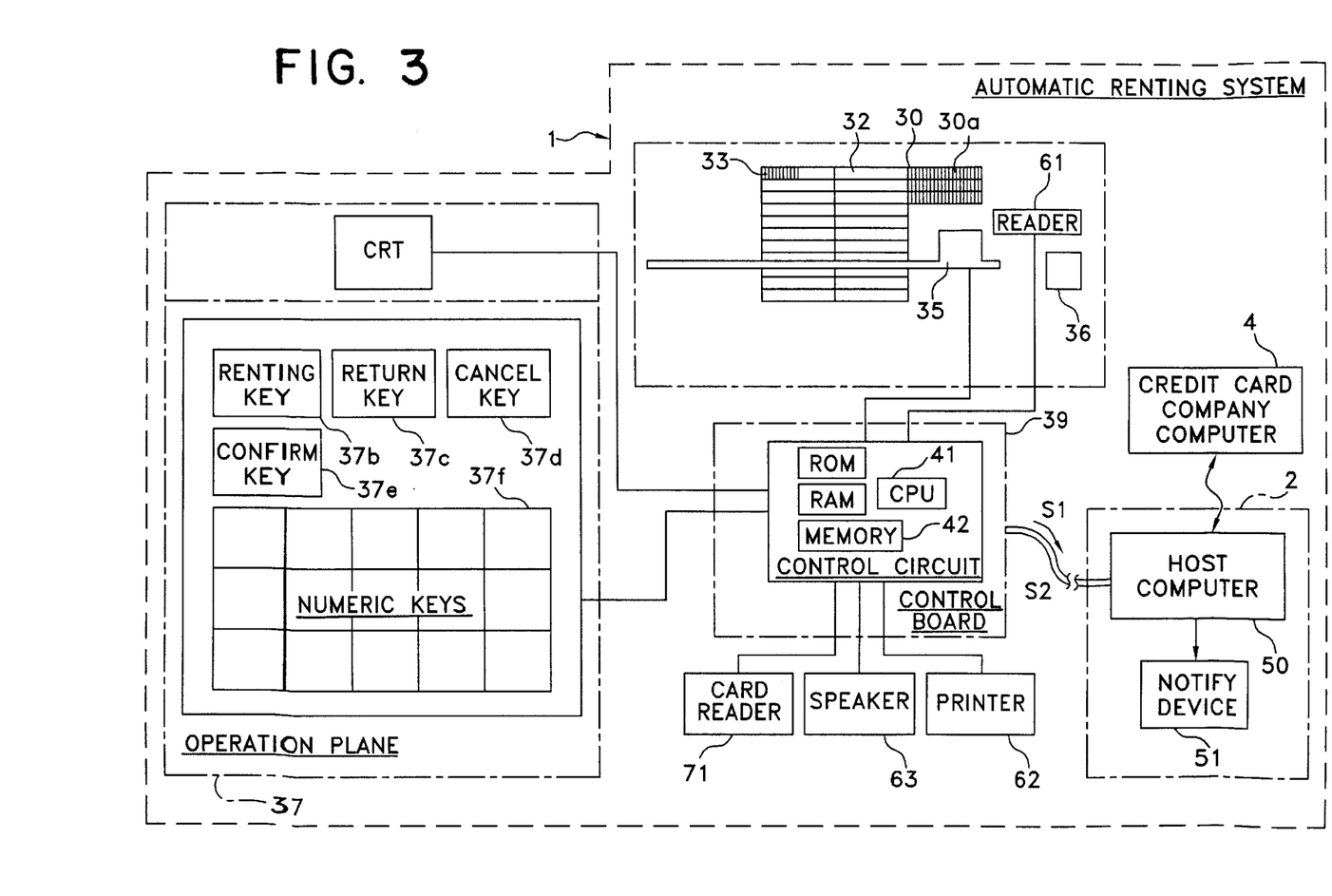
FIG. 3 is a schematic block diagram showing a control system of the preferred embodiment of the automatic renting apparatus of FIG. 2.

FIG. 2 is diagrammatic illustration of the mechanical construction of the preferred embodiment of the automatic renting apparatus according to the invention. FIG. 3 shows a control system of the automatic renting system shown, together with the mechanical construction. The automatic renting apparatus 3 for the video cassette includes a vertically elongated rectangular parallelepiped main body casing 31, a multi-level video cassette storage portions 32 constructed within the main body casing 31, and a control board 39.

A transporting mechanism 35 is provided for removing a video cassette 34 from a respective storage shelf 33 in the storage portion 32 and for transporting the video cassette as needed. The transporting mechanism 35 includes an X-Y movable stage 35a which is movable in vertical and horizontal directions on a X-Y plane parallel to the front face plane of the main body casing and operating according to a coordinate system established in the apparatus. A gripper 35b is supported on the movable stage 35a and movable in a Z-axis direction. Gripper 35b is used to remove and replace video cassette stored on the storage shelves 33. Such a transporting mechanism is known per se.

Adjacent to the storage portion 32, an auxiliary storage portion 30 having a plurality of auxiliary storage shelves 30a for storing video cassettes which are prohibited to return to the storage portion 32.

The front face of the main body casing 31 is formed with a video cassette renting and returning opening 36. Adjacent the opening 36 is an operation plane 37 and a display portion 38. The operation plane 37 has a slot 37a for receiving a credit card and a set of keys, including a renting key 37b for selecting the rental of a video cassette, a returning key 37c for commanding the return of a video cassette, a canceling key 37d for canceling input, and a confirmation key 37e for entry of agreement to a member code for handling the automatic renting apparatus. Ten additional (numeric) keys 37f are also provided on the operation plane 37 for entering the video cassette number.

As shown in FIG. 3, the control board 39 arranged in the main body casing has a microcomputer cased control circuit 41. The control circuit 41 includes a CPU, ROM, RAM, and a back-up memory 42 for maintaining a preceding operating condition if the power supply is interrupted. The control circuit 41 is also connected to a remote host computer 50 in the control center 2 via a modem, telephone line, or similar types of connection.

A card reader 71 is connected as an input to the control circuit 41. The card reader 71 is designed to read information stored on a credit card when the card is inserted through the card insertion slot 37a. The card information read by the card reader 71 is transmitted to the host computer 50 of the control center 2 via the modem and the telephone line under control of the CPU.

The control circuit 41 monitors expiration of a returning period of each of the rented video cassettes under control of the CPU. For this purpose, a correspondence table is stored in the RAM. The correspondence table includes stored video cassette information, renting video cassette information, rented date and time, return period, and information concerning members who have rented the video cassettes. On the basis of this stored information (e.g., the trade status), when a video cassette is not returned by the expiration of the return period, a sale of the non-returned video cassette is carried out. When a video cassette is sold in this manner, information S1 indicative of this sale is transmitted to the host computer 50 of the control center 2.

A reader 61 is also connected as an to the control circuit 41. The reader 61 is designed to read video cassette identification information from video cassettes which are rented and returned via the renting and returning opening 36. When the identification information is provided on each individual video cassette in a form of bar-code, reader 61 can be a bar-code reader.

Based on the information from the reader 61, the control circuit 41 judges whether the returned video cassette can be returned to a designated storage shelf 33 in the storage portion 32. If the video cassette cannot be returned to the designated storage shelf 33, the control circuit 41 acts to store the video cassette on the auxiliary storage shelf 30a of the auxiliary storage portion 30. This operation can be realized as an interrupt control program stored in the ROM.

The control circuit 41 has output means including the display portion 38, a printer 62, a speaker 63 and the like. When a video cassette is stored in the storage shelf 30a of the auxiliary storage portion 30 by the transporting mechanism 35, the fact is reported via the output means. When the video cassette is erroneously returned, notice is provided to the user instructing them to remove the video cassette from the renting and returning opening 36.

An abnormal trade occurs when a video cassette is stored in a storage shelf in the auxiliary storage portion. In the event of an abnormal trade, a signal S2 indicating this condition is sent to the host computer 50. A notice device 51 at the host computer 50, such as a speaker, is used to notify a manager that an erroneous return of a video cassette has occurred.

Next, the renting and returning operations of a video cassette via the automatic renting apparatus 3 will be discussed with reference to flowcharts shown in FIGS. 4 to 8.

Figure 4:
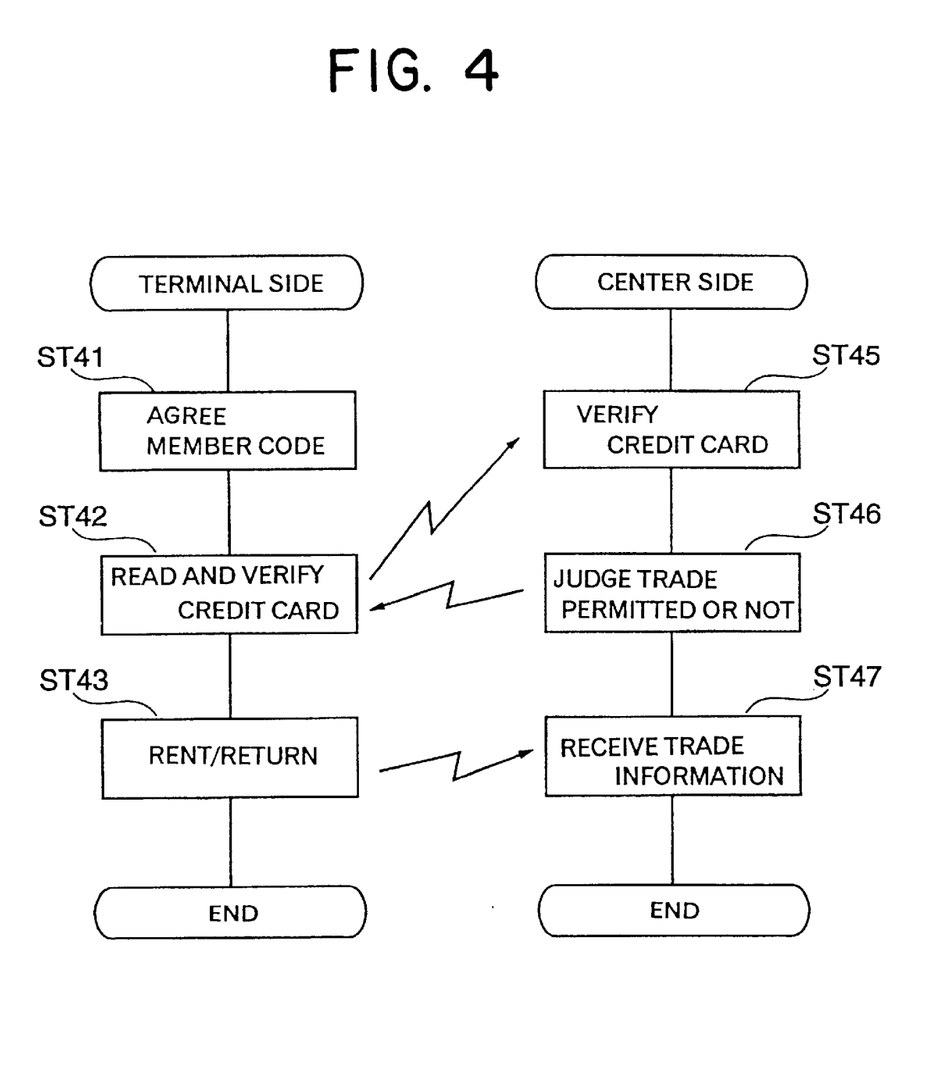
FIG. 4 is a flowchart showing the general operation of the preferred embodiment of the automatic renting system of FIG. 1.
Figure 5:
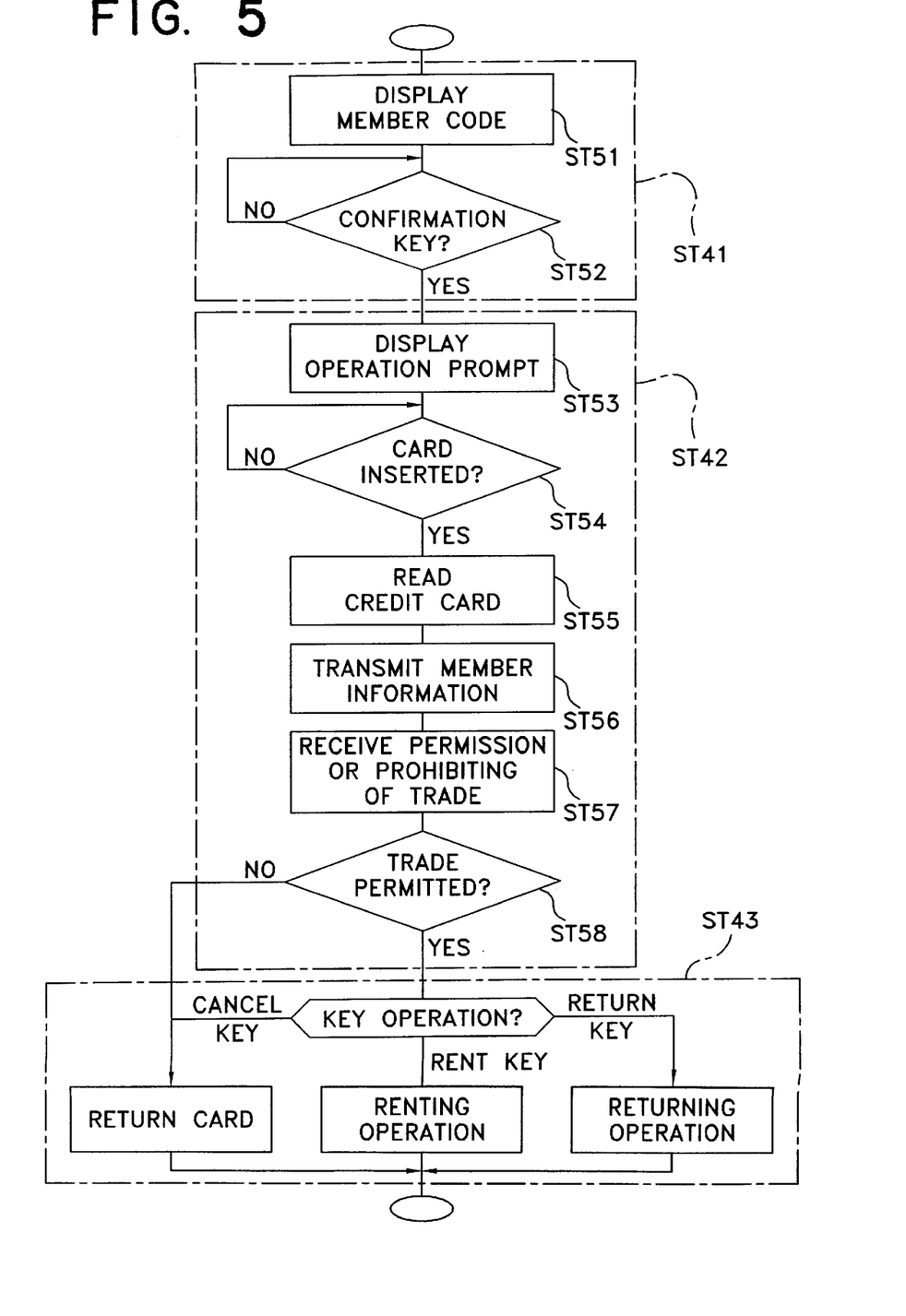
FIG. 5 is a flowchart showing the operation of the preferred embodiment of the automatic renting apparatus of FIG. 2.

At first, with reference to FIGS. 4 and 5, the general operation of the automatic renting system 1 will be discussed. In the automatic renting apparatus 3, the member agreement code is displayed on the display screen 38. The code includes a statement such as "When the return period of the video cassette is expired, the video cassette shall be regarded as being purchased to perform sale process, and the charge shall be automatically deduced from the account of the credit card" is presented. The member is required to agree before a rental occurs (step ST41). The automatic renting apparatus 3 then reads information from a credit card inserted through the card insertion slot 37a and checks the content of the credit card.

Reading of the credit card is performed by the card reader 71. The read member information is transmitted to the host computer 50 of the control center 2 via a communication line. The host computer 50 makes an inquiry to the committed credit card company 4 to determine credibility and the like for the member on the basis of the received member information (step ST45). The host computer 50 judges whether the trade is permissible or not according to the credibility of the member (i.e., whether renting of the video cassette is possible or not) (step ST46). The result of judgment is then transmitted to the automatic renting apparatus The automatic renting apparatus 3 performs or prohibits renting and returning operation of the video cassette on the basis of the judgment command provided by the control center (step ST43).

After completion of renting and returning control operation, the trade information is transmitted to the control center 2. At the control center 2 side, the received trade information is stored in a memory (step ST47)

The process at steps ST41 and ST42 will now be discussed in detail with reference to the flowchart shown in FIG. 5. As shown in FIG. 5, the member code is constantly displayed on the display screen 38 (step ST51). When the user operates a confirmation key 37e (step ST52), a judgement is made that the user has agreed to the member code. Next, at step ST42, instructions for operating the system are displayed. Then, the member is prompted to insert their credit card and the apparatus waits for insertion of the credit card into the card insertion slot 37*a* (step ST54). Once the credit card is inserted into the card insertion slot 37*a*, the card is read by the card reader 71 (step ST55). Read member information is transmitted to the control center 2 (step ST56). Subsequently, a command granting or prohibiting the trade is received from the control center 2 (step ST57) and analyzed (step ST58).

When the trading is prohibited, the credit card is returned and the control is returned to the initial state. When the trade permitted, the process moves to the step ST43. When the key operated by the user is the renting key 37*b*, renting control process is executed. When the key operated by the user is the return key 37*c*, the returning control operation is executed. When the operated key is the cancellation key 37*d*, a card returning operation is executed.

If trade permission has been granted and the member has previously performed an abnormal trade, discussed in more detail below, and if the video cassette causing the past abnormal trade is retained in the auxiliary storage portion 30, the video cassette is first returned to the user and the user is notified of the abnormal trade. The process then moves to the next control operation.

Figure 6:
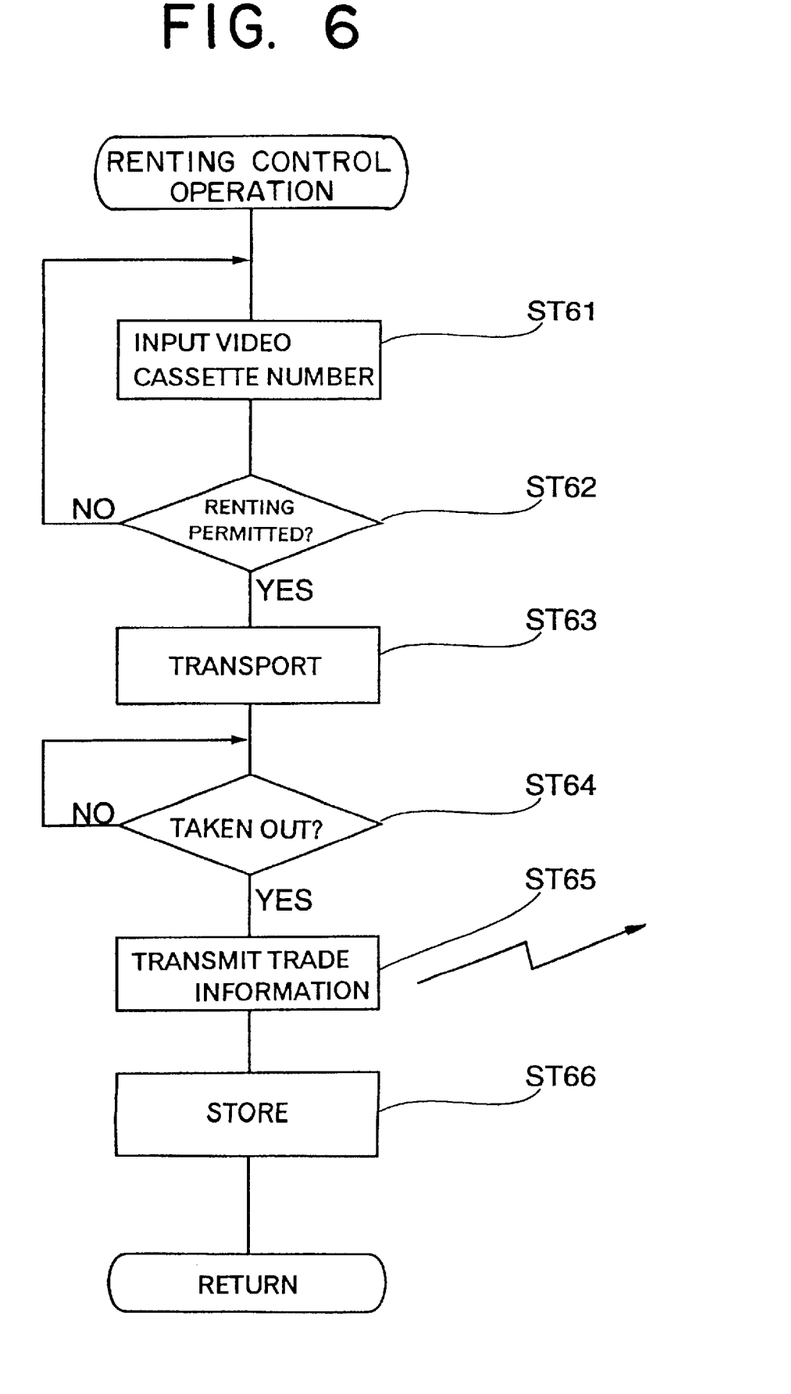
FIG. 6 is a flowchart showing a renting control operation of the preferred embodiment of the automatic renting apparatus of FIG. 2.

FIG. 6 shows a flowchart of the renting control operation. In the renting control operation, a prompt is first displayed on the display screen instructing the user to enter the video cassette number to be rented via the keys 37*f* (step ST61). Once the video cassette number is input, a judgement is made as to whether the video cassette can be rented or not (step ST62). If the requested video cassette has already been rented, and thus cannot be rented to the present user, this fact is displayed and the user is prompted to enter another video cassette number.

When renting is possible, the transporting mechanism 35 is driven to take the requested video cassette from the corresponding storage shelf 33 in the storage portion 32, and to transport the video cassette to the renting and returning opening 36 (step ST63). After the user takes the video cassette out the renting and returning opening 36 (step ST64) and the renting operation is completed, the trade information (information including member information, rented video cassette number, rented date and time, returning date and time, rental fee) is transmitted to the control center 2 and stored in RAM (steps ST65, 66).

Figure 7:
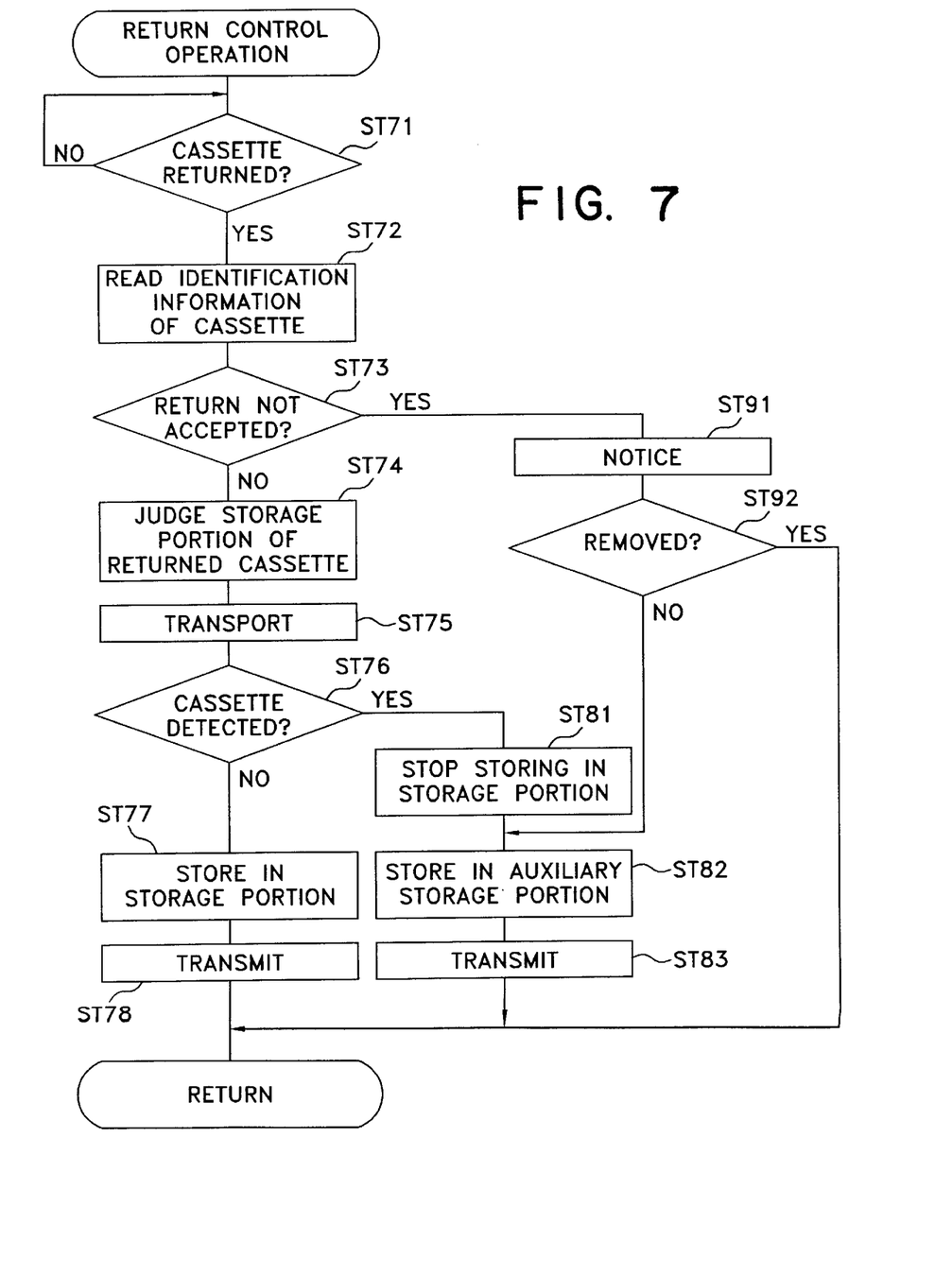
FIG. 7 is a flowchart showing a returning control operation of the preferred embodiment of the automatic renting apparatus of FIG. 2.

FIG. 7 is a flowchart showing operation of returning control. During a returning control operation, when the return key 37*c* is pressed, the renting and returning opening 36 is opened to receive the video cassette (step ST71). The identification information, such as bar code adhered on the video cassette is read by the reader 61 (step ST72). The determined cassette identity is used to cross reference the correspondence table (which contains the video cassette and corresponding storage shelf 33 information) to determine the appropriate storage shelf 33 to receive the returned video cassette(step ST74). Subsequently, the transporting mechanism 35 is driven to transport the returned video cassette to the identified storage shelf 33 and store it therein (steps ST75 and ST77). After completion of the returning operation, the trade information (including returned video cassette number, the member information, the returned date and time) is transmitted to the control center 2 (step ST78) and stored in the host computer of the control center 2.

When the identified storage shelf 33 is determined to already have a video cassette stored in it, the storage operation is interrupted (steps ST76 and ST81). Detection of whether a video cassette is already stored in the corresponding storage shelf 33 can be done with a sensor mounted on the gripper 35*b* of the transporting mechanism 35. Alternatively, sensors are provided in each individual storage shelves 33 to detect vacancy or not of the corresponding storage shelf 33.

When another cassette is already stored in the designated storage shelf 33, the returned video storing operation is terminated. The transporting mechanism 35 transports the video cassette to the auxiliary storage portion 30 and stores it in a vacant shelf 30*a* (step ST82). A judgement as to which storage shelf 30*a* is vacant is made by means of the sensor on the gripper 35*b* of the transporting mechanism 35 or by sensors on respective storage portions 30*a*. Alternatively, information regarding vacant storage shelves can be stored in of the control circuit. Information regarding the storage of the returned cassette in auxiliary storage is transmitted to the control center 2 (step ST83)

As set forth above, if there is no vacant storage shelf 33 of the storage portion 32 to return the returned video cassette, such video cassette is stored in the storage shelf 30*a* of the auxiliary storage portion 30. It can be appreciated that when a person, such as the owner or an employee of the video cassette renting shop, performs a counterchanging operation and adds new cassettes to the machine, the cassettes should be placed on empty shelves which are not assigned to a rented video cassette. However, even when a new video cassette is erroneously stored in a storage shelf which is assigned to a rented cassette being in rented, the operation of the automatic renting apparatus 3 can continue without interruption because the returned cassette will simply be stored in the auxiliary storage portion 30.

In the event that the identification information of the returned cassette as read by the reader 61 indicates that the cassette is not one under management of the automatic renting apparatus 3, or when the identification information of the video cassette cannot be read, a judgement is made that returning operation is not possible (step ST73). The user is notified of this condition by a message displayed on the display portion 38. A voice message, such as "please remove the video cassette tape", can also be provided through the speaker 63 (step SP91). After issuing an alarm, if the user does not remove the video cassette from the renting and returning opening 36 (step ST92), the video cassette is stored in a vacant storage shelf among the auxiliary storage shelves 30*a* of the auxiliary storage portion 30. Thus, in the case when an erroneously returned video cassette is left in the renting and returning opening, automatic renting, operation can continued by storing the unremoved video cassette in the auxiliary storage portion 30.

If it is determined that the return period for a returned cassette has expired, a judgement is made that the video cassette cannot be returned. The user is notified of this fact and instructed to remove the returned cassette from the renting and returning opening 36. As discussed, in the shown embodiment of the automatic renting apparatus 3, a video cassette which is not returned by the expiration of the returning period is sold to the user who has not returned (see FIG. 8), with the sale charge being deducted from the member's credit card account. Since the cassette is sold to the member after the return period expires, an attempted return of the video cassette after this time is rejected.

It should be noted that when a video cassette is stored in the auxiliary storage portion 30 as a result of a return video cassette after expiration of the period coupled with failure to take the "sold" cassette from the machine, as discussed above, an occurrence of an abnormal trade is indicated, and information relating to the abnormal trade (including member information and the video cassette information) is provided to the host computer 50 at the control center 2.

In the automatic renting apparatus 3, when power is interrupted, the driving condition at the time of interruption is maintained in the back-up memory. Upon resumption of power supply, system operation is resumed on the basis of the stored content in the back-up memory. For example, when the transporting mechanism is transporting a video cassette, the storage location is identified on the basis of the content of the back-up memory to transport and store the video cassette to the correct storage shelf 33. If the storage location of the video cassette being stored cannot be identified on basis of the information maintained in the back-up memory, the video cassette is stored in the auxiliary storage portion 30.

As set forth above, even when the video cassette is left in the transporting path upon interruption of power supply, such as service interruption, the video cassette is stored in the auxiliary storage portion so that the automatic renting apparatus 3 can resume automatic renting operation immediately after recovery from interruption of service.

Figure 8:
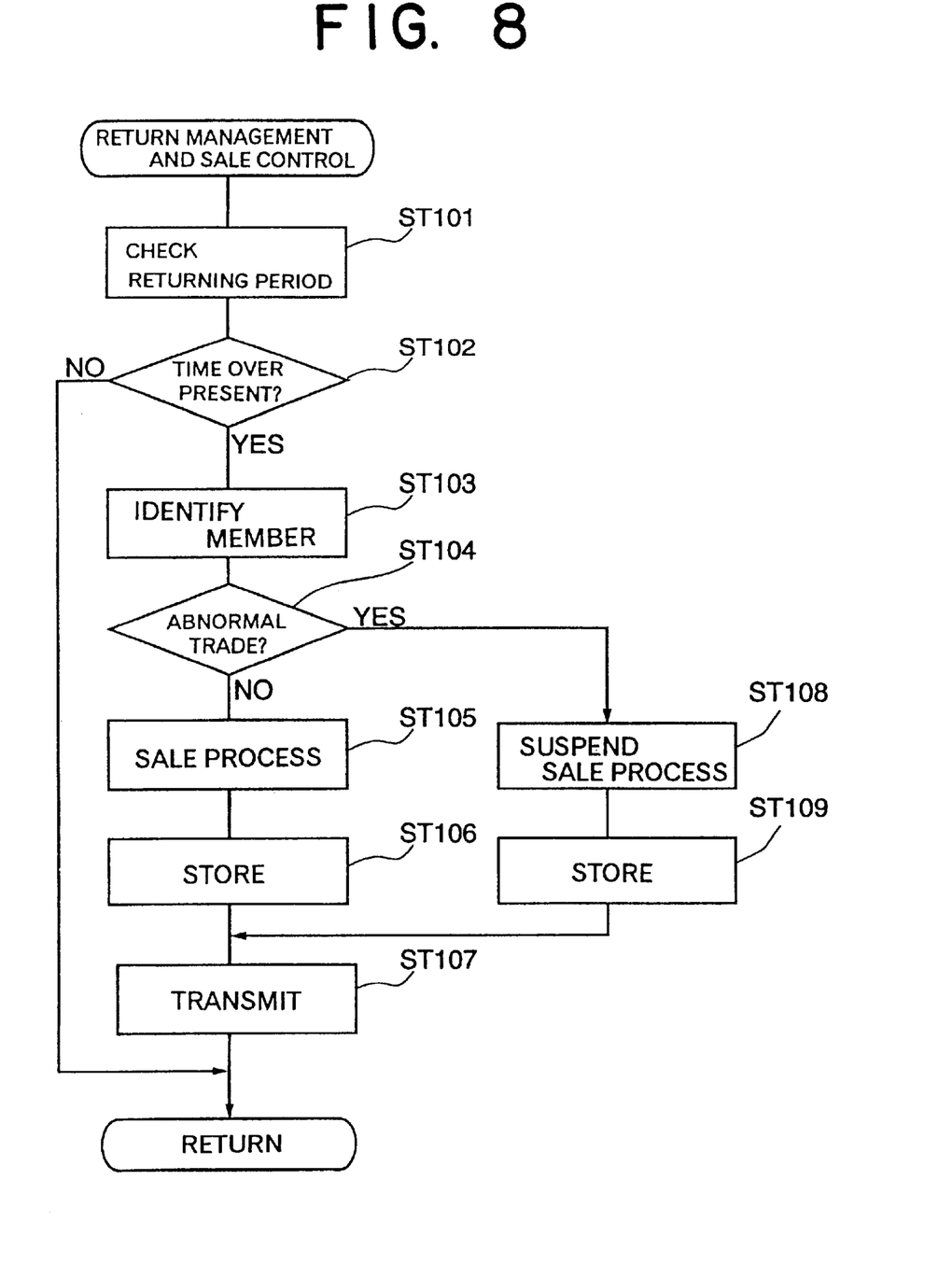
FIG. 8 is a flowchart showing a returning period management of the preferred embodiment of the automatic renting apparatus of FIG. 2.

FIG. 8 is a flowchart showing operation of the returning management and sale control operation. The returning management and sale control operation is a control routine which is constantly executed in the control circuit 39 of the automatic renting apparatus 3. In the control routine, a check is regularly performed to identify rented video cassettes whose returning periods have expired (step ST101 and ST102). When such a video cassette is detected, the member who rented the video cassette in question is identified (step ST103).

Next, a judgement is made whether such identified user has performed an abnormal trade (see FIG. 7). If an abnormal trade was not performed, the process that sells the video cassette to the user, is executed (step ST105). When this process is complete, the trade information (including the sold video cassette, purchasing user, sale date and time, sale charge) is stored in the RAM and the trade information is transmitted to the control center 2 (steps ST106 and ST107).

Thus, the automatic renting apparatus 3 deals with the video cassette which has not been returned by the expiration of the returning period of the video cassette by selling it to the user who rented the video cassette in question. The trade information is transmitted to the control center 2. The control center 2 issues a request to the committed credit card company to deduct sale charge from the account of the credit card. Thus, even when a large number of video cassettes are not returned within the returning period is increased, the system management procedure does not become complicated or troublesome.

It is not unusual for a user to erroneously return the wrong video cassette. In such cases, as discussed with respect to the flow chart of FIG. 7, if the user does not notice the error immediately after returning the cassette, the erroneously returned video cassette is temporarily stored in the auxiliary storage portion 30 and an abnormal trade is recorded. In these circumstances, it is possible that while the user believes that the proper video cassette has been returned in a timely manner, the automatic renting apparatus 3 may perform the sale process for the video cassette not returned within the returning period. To avoid such a situation, preferably, upon executing the sale process, the presence of an abnormal trade is checked with respect to the user in question (step ST104). If an abnormal trade has been recorded, the sale process is temporarily suspended (step ST108). Information about the temporary suspension of the sale process is stored and also transmitted to the control center 2 (steps ST109 and ST107).

As set forth above, the automatic renting system according to the present invention permits settlement of charges using the credit card as the member card, and, if the rented article not returned within the returning period, it is sold to the rented user and the sale charge is settled using the credit card. Therefore, according to the present invention, even for non-returned rented articles, an automated process is possible.

In addition, according to the present invention, when a user erroneously returns the wrong rented article, even when the user does not return the correct rented article within the returning period, a sale process for the right rented article is not performed immediately. Thus, time is provided for the user to retrieve the erroneously returned article and to return the proper cassette.

Furthermore, according to the present invention, in addition to the storage portion of the renting articles, an auxiliary storage portion is arranged so that a rented article which is returned in abnormal trade can be temporarily stored in the auxiliary storage portion. As a result, the rented article returned by the abnormal trade is not be left in the renting and returning opening.

Although the invention has been illustrated and described with respect to exemplary embodiment thereof, it should be understood by those skilled in the art that the foregoing and various other changes, omissions, and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the claims.

For instance, while the foregoing embodiment has been discussed in terms of renting video cassettes, the articles applicable for the automatic renting system according to the present invention should not be limited to video cassettes, but can also include any articles to be rented for a fixed relatively short period.

What is claimed is:

1. An automatic article renting apparatus comprising:

an article storage portion;

an article renting opening;

article transporting means for transporting the article between said article storage portion and said article renting opening;

a card reader for reading a credit card information;

input means for entering identification of the article to be rented;

communication means for communicating with a remote host computer;

control means for performing an automatic renting process with a member owning a credit card inserted into said card reader, the automatic renting process performed on the basis of input from said card reader, said input means, and a command from said remote host computer;

storage means for storing rental information including rented article information, rental date, scheduled return date, and member information;

judgement means for detecting when an article rented by a member is not returned by the scheduled return date; and sale processing means responsive to the detection by said judgement means of a rented article not returned by the return date to process a sale of the non-return rented article to the member who rented the non-return rented article and to transmit sale charge information to said remote host computer via said communication means.

2. An automatic article renting apparatus as set forth in claim 1, wherein said storage means comprises:

a storage area for storing information concerning the non-return article processed by said sale processing means; and returning rejecting means for rejecting the return of a rented article for which the sale processing means has already processed a sale.

3. An automatic article renting apparatus as set forth in claim 1, wherein said control means is responsive to the processing of a sale by said sale processing means to transmit notice of the sale and information about the sold article to said remote host computer via said communication means.

4. An automatic article renting apparatus as set forth in claim 1, which further comprises:

an article returning opening for receiving a returned article;

an auxiliary article storage portion for temporarily storing the returned article;

commanding means for instructing the member to remove the returned article from said article returning opening when said article received in said article returning opening is not included in the rental information stored in said storage means; and storage control means for storing the article in said auxiliary article storage portion when the returned article is not removed from said article returning opening in response to removal instructions from said commanding means.

5. An automatic article renting apparatus as set forth in claim 4, wherein said storage means stores abnormal trade information including information indicative of an occurrence of an abnormal trade, information related to said returned article, and information concerning the member returning said article.

6. An automatic article renting apparatus as set forth in claim 5, wherein said communication means transmits said abnormal trade information to said remote host computer.

7. An automatic article renting apparatus as set forth in claim 6, wherein said sale processing means is configured to suspend said sale process of the non-returned rented article to the member when abnormal trade information stored in the storage means indicates that an abnormal trade is attributed to the member, and is configured to transmit information concerning suspension of the sale process to said remote host computer via said communication means.

8. An automatic article renting apparatus as set forth in claim 5, which further comprises article returning control means for returning the article stored in said auxiliary article storage portion to the member when information stored in the storage means indicates that the article stored in said auxiliary article storage portion was stored in response to an abnormal trade attributed to the member.

9. An automatic article renting system comprising:

a plurality of automatic article renting terminal apparatus:

a central control center connected to said automatic article renting terminal apparatus and storing information including information indicating a renting condition with respect to each automatic article renting terminal apparatus and member information of each member;

each of said automatic article renting terminal apparatus comprising:

an article storage portion;

an article renting opening;

article transporting means for transporting the article between said article storage portion and said article renting opening;

a card reader for reading a credit card information;

input means for entering identification of the article to be rented;

communication means for communicating with a central control center;

control means for performing an automatic renting process with a member owning a credit card inserted into said card reader, the automatic renting process performed on the basis of input from said card reader, said input means, and a command from said central control center;

storage means for storing rental information including rented article information, rental date, scheduled return date, and member information;

judgement means for detecting when an article rented by a member is not returned by the scheduled return date; and sale processing means responsive to the detection by said judgement means of a rented article not returned by the return date to process a sale of the non-return rented article to the member who rented the non-return rented article and to transmit sale charge information to said central control center via said communication means.

10. An automatic article renting system as set forth in claim 9, wherein said storage means includes comprises:

a storage area for storing information concerning the non-return article processed by said sale processing means; and returning rejecting means for rejecting the return of a rented article for which the sale processing means has already processed a sale.

11. An automatic article renting system as set forth in claim 9, wherein said control means is responsive to the processing of a sale by said sale processing means to transmit notice of the sale and information about the sold article to said central control center via said communication means.

12. An automatic article renting system as set forth in claim 9, which further comprises:

an article returning opening for receiving a returned article;

an auxiliary article storage portion for temporarily storing the returned article;

commanding means for instructing the member to remove the returned article from said article returning opening when said article received in said article returning opening is not included in the rental information stored in said storage means; and storage control means for storing the article in said auxiliary article storage portion when the returned article is not removed out from said article returning opening in response to removal instructions from said commanding means.

13. An automatic article renting system as set forth in claim 12, wherein said storage means stores abnormal trade information including information indicative of an occurrence of an abnormal trade, information related to said returned article, and information concerning the member returning said article.

14. An automatic article renting system as set forth in claim 13, wherein said communication means transmits said abnormal trade information to said central control center.

15. An automatic article renting system as set forth in claim 14, wherein said sale processing means is configured to suspend said sale process of the non-returned rented article to the member when abnormal trade information stored in the storage means indicates that an abnormal trade is attributed to the member, and is configured to transmit information concerning suspension of the sale process to said central control center via said communication means.

16. An automatic article renting system as set forth in claim 13, which further comprises article returning control means for returning the article stored in said auxiliary article storage portion when information stored in the storage means indicates that the article stored in said auxiliary article storage portion was stored in response to an abnormal trade attributed to the member.

17. An automatic article renting apparatus as set forth in claim 2, wherein said control means is responsive to the processing of a sale by said sale processing means to transmit notice of the sale and information about the sold article to said remote host computer via said communication means.

* * * * *